(12) United States Patent
Spielberg

(10) Patent No.: US 8,994,876 B2
(45) Date of Patent: Mar. 31, 2015

(54) PHOTOGRAPHIC EXPOSURE VIA REAL TIME BROADCAST OF LIGHTING PARAMETERS

(71) Applicant: International Business Machines Corporation, Armonk, NY (US)

(72) Inventor: Anthony C. Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 13/720,868

(22) Filed: Dec. 19, 2012

(65) Prior Publication Data
US 2014/0168459 A1    Jun. 19, 2014

(51) Int. Cl.
*H04N 5/222* (2006.01)
*G03B 15/03* (2006.01)
*H04N 5/232* (2006.01)
*H04N 5/235* (2006.01)
*H04N 9/73* (2006.01)

(52) U.S. Cl.
CPC ......... *H04N 5/23203* (2013.01); *H04N 5/2354* (2013.01); *H04N 9/735* (2013.01)
USPC .............................. 348/370; 396/164; 362/11

(58) Field of Classification Search
CPC ..... H04N 5/2256; H04N 5/2354; G03B 7/16; G03B 15/03; G03B 15/04; G03B 15/05; G03B 2215/05; G03B 2215/0514; G03B 2215/0596
USPC ......... 348/370, 371; 396/164; 362/11, 12, 13, 362/14, 4
See application file for complete search history.

(56) References Cited

U.S. PATENT DOCUMENTS

| | | | |
|---|---|---|---|
| 7,443,443 B2 | 10/2008 | Raskar et al. | |
| 7,616,243 B2 | 11/2009 | Kozlowski | |
| 7,702,228 B2 * | 4/2010 | Clark | 396/56 |
| 7,710,466 B2 | 5/2010 | Drader et al. | |
| 7,783,188 B2 * | 8/2010 | Clark | 348/371 |
| 7,825,958 B2 | 11/2010 | Drader et al. | |
| 7,916,181 B2 | 3/2011 | Nilehn et al. | |
| 7,978,230 B2 | 7/2011 | Drader et al. | |
| 8,571,400 B2 * | 10/2013 | King | 396/164 |
| 8,600,224 B2 * | 12/2013 | Clark | 396/56 |

(Continued)

FOREIGN PATENT DOCUMENTS

| | | | |
|---|---|---|---|
| EP | 1311114 A2 | 5/2003 | |
| JP | 2005094363 A | * | 4/2005 |
| JP | 2011221363 A | * | 11/2011 |

*Primary Examiner* — John Villecco
(74) *Attorney, Agent, or Firm* — Kunzler Law Group; Damion Josephs

(57) ABSTRACT

A system for photographic exposure via real-time broadcast of lighting parameters. The system includes a light source that emits light at different color temperatures and intensities controlled by a controller. The controller generates light source data that is transmitted to a digital imaging device. The digital imaging device includes a receiver for receiving the signal from the light source and a processor processing the light source data for determining color temperature, intensity, and timing of light emitted by the light source for generating exposure data. The exposure data determines when to commence capturing an image of a desired exposure and color temperature for achieving a desired exposure. The digital imaging device includes a display for displaying the exposure data to a user for allowing the user to select when to actuate the shutter release for capturing the image with the desired color temperature and exposure.

20 Claims, 8 Drawing Sheets

(56) References Cited

U.S. PATENT DOCUMENTS

| | | | |
|---|---|---|---|
| 8,824,881 B2* | 9/2014 | Li et al. ........................ 396/155 |
| 8,860,843 B2* | 10/2014 | Mate et al. ................... 348/370 |
| 2009/0027511 A1* | 1/2009 | Kouno ....................... 348/222.1 |
| 2010/0165143 A1 | 7/2010 | Drader et al. |
| 2010/0277610 A1* | 11/2010 | Kakkori et al. ............... 348/370 |
| 2011/0025879 A1 | 2/2011 | Drader et al. |
| 2011/0234846 A1 | 9/2011 | Drader et al. |
| 2011/0280561 A1* | 11/2011 | Geffert et al. ................. 396/164 |
| 2012/0229699 A1* | 9/2012 | Mate et al. .................... 348/370 |
| 2012/0320262 A1* | 12/2012 | Chung ........................ 348/370 |
| 2013/0120636 A1* | 5/2013 | Baer ............................ 348/370 |
| 2014/0267846 A1* | 9/2014 | Myhrvold et al. ............ 348/272 |

\* cited by examiner

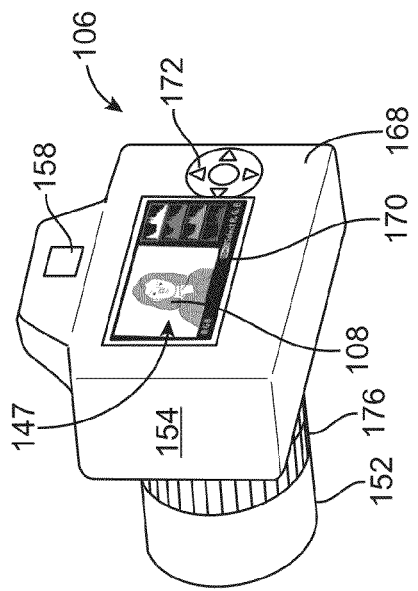
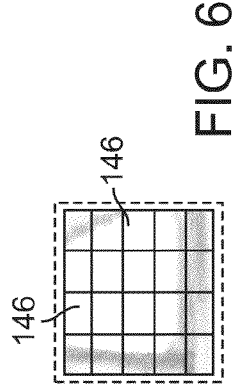
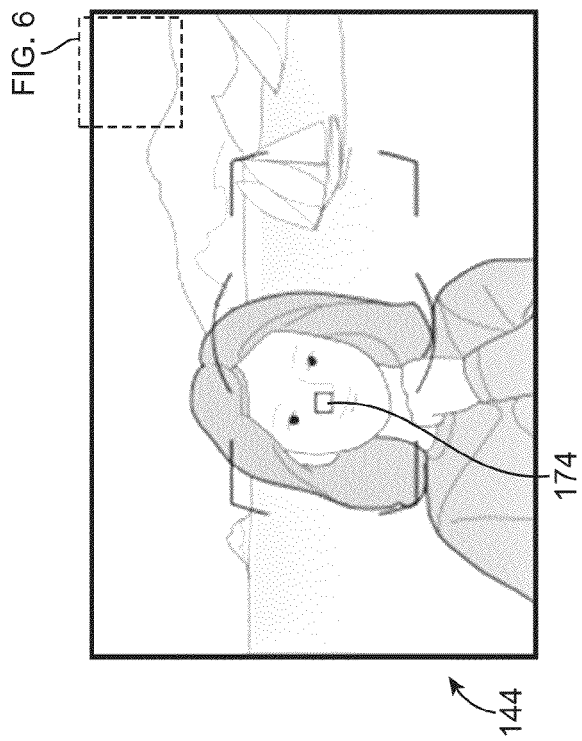
FIG. 5
FIG. 6

PHOTOGRAPHIC EXPOSURE VIA REAL TIME BROADCAST OF LIGHTING PARAMETERS

BACKGROUND

The present invention relates generally to lighting for photography, and more particularly, to a system for photographic exposure via real-time broadcast of lighting parameters.

Ambient or available lighting is often insufficient to allow a camera to capture and create a properly exposed image, including digital images. One well known effort to increase available light comprises flash devices. Flash devices are frequently built directly into the camera in consumer and hobbyist level cameras, while they are most often externally mounted to professional level digital single-lens reflex cameras, known as digital-SLRs or DSLRs.

Known flash devices, commonly referred to simply as "Flashes", typically produce a flash of artificial light with a duration ranging from about $1/10,000$ of a second to about $1/200$ of a second, at a color temperature of about 5,500 Kelvin (K) to help illuminate a scene. While flashes are most commonly used to substantially increase the available light a scene, they are also used to capture objects moving quickly through the scene, or to change the quality of light of the scene.

To increase available light in a commercial setting, so-called "studio lighting" is used. Studio lighting typically comprises continuous lighting or strobe lighting, and frequently a combination of both continuous lighting or strobe lighting. A benefit of continuous lighting is that the photographer continuously receives feedback on how the subject looks in an image to be captured which allows the photographer to adjust either the angle and intensity of the lighting on the subject, or the settings on their camera, to achieve the desired exposure.

Lights used for continuous lighting are typically divided into two categories in the art known as "hot-lights" and "cool-lights". Hot-lights typically comprise tungsten or halogen and become extremely hot to the touch during use, to the point of potentially burning a user. Since they become so thermally hot, hot-lights can cause a fire and may be uncomfortable if they're directed into a subject's eyes. A known issue with hot-lights is, that they may not generate sufficient light for photographing people. Resultantly, the studio photographer needs to set their camera to a relatively high ISO setting, which may detract from the quality of images being captured. They are also very "warm" in color temperature, typically around 7,500K, so it can be problematic to mix the color temperature emitted by hot-lights with daylight color temperature sources, such as a flash.

Cool-lights are often preferred to hot-lights by studio photographers. Since they don't become thermally hot, cool-lights don't create a risk of fire and they are more comfortable for a subject. Cool-lights often comprise fluorescent lights and emit light with a color temperature of about 5,500K. As such, cool-lights are often useful if there is ambient daylight, which has a color temperature of about 5,500K, in the studio and they can be used in conjunction with flash. However, as with hot-lights, cool-lights often do not generate sufficient light for photographing people, particularly as compared to flash lighting. Thus, studio photographers using cool-lights are relegated to using high ISO settings on their camera while capturing images, which again may detract from the quality of images being captured.

Due to recent advances in light-emitting diode (LED) technologies, LEDs lighting systems are an emerging lighting source that is well suited for studio lighting use. In an LED studio light, a multiplicity of LEDs, comprising an LED array, are configured in a variety of sizes and formats. These formats include flat panel light arrays, diffused light panels, spot lights, and flood lights. LEDs can be adjusted to emit light at different color temperatures. As continuous light source, LEDs are easy to use when lighting a subject, give off low levels of heat, and are power efficient.

In addition continuous lighting, "strobe" or "electronic flash" lighting is a highly popular choice that offers a great degree of control and flexibility. Electronic flashes are typically daylight balanced (5,500K) and can be used for studio applications. When lighting with electronic flash, the exposure is made by the discharge of a powerful micro-burst of light, which is generated by a power pack, or generator, and output through the flash's lamp head. Because the exposure is captured in a single, instantaneous, and powerful flash of light, flash lighting is ideal for stopping fast-moving subjects, living and otherwise. The power output of studio flash is measured in Watt-seconds (W/s). The least powerful electronic flash packs are rated as low as 100 W/s, while the largest flash packs are rated at 6400 W/s. Flash durations vary from about $1/100$th second, to micro-bursts that are as short as $1/12,000$ second, depending on whether the pack is set to full output power or a lower output setting. The ability to precisely adjust the intensity of the light as well as the option to sync with faster shutter speed of the photographer's camera make electronic flash lighting systems suitable for capturing subjects in motion.

However, even new and sophisticated light sources still pose challenges for photography. An issue with known LED lighting is that the intensity of the light emitted by the LED array is prone to varying, sometimes rapidly, over time. Similarly, the spectral distribution of the light source, the color of light emitted by the light source, can sometimes vary rapidly over time. Solutions to the problems these issues pose and methods for how to alleviate them, require complex measurement and analysis of variations in lighting. This complex measurement and analysis is typically performed in-camera. As can be appreciated, a disadvantage to such a solution is the additional complexity, and thus increased cost, of a camera embodying the technology to perform the complex measurement and analysis. Another disadvantage is that there can be inaccuracies resulting from imperfect measurements or modeling of predictable variations in lighting parameters. Another disadvantage is that there can be inaccuracies resulting from unpredictable variations in lighting parameters.

BRIEF SUMMARY

In one embodiment, a system includes a controller that varies at least one of intensity and color temperature of light emitted by the light source and generates light source data that comprises at least one of intensity and color temperature of light emitted by the light source and comprising timing of at least one of intensity and color temperature of light emitted by the light source. The system also includes a digital imaging device that comprises a shutter, a receiver for receiving a signal from the light source comprising the light source data, and a processor. The processor processes the light source data for capturing an image having at least one of a known intensity and color temperature of light for achieving a desired exposure of the image.

In another embodiment a system that includes a controller. The controller varies at least one of intensity and color temperature of light emitted by the light source and generates light source data comprising at least one of intensity and color temperature of light emitted by the light source and comprising timing of at least one of intensity and color temperature of light emitted by the light source. The system also includes a digital imaging device that comprises a shutter, a receiver for receiving a signal from the light source comprising the light source data, and a processor processing the light source data for determining a point in time to capture an image having at least one of a desired intensity and color temperature of light for achieving a desired exposure of the image and for generating exposure information. The digital imaging device also includes a display for displaying the exposure information allowing a user to select when to actuate the shutter to capture the image with the desired exposure and color.

In another embodiment, a system that comprises a light source. The light source comprises at least one lamp capable of emitting at least one of light at different intensities and light at different color temperatures. The system also comprises a controller for controlling at least one of intensity and color temperature of light emitted by the at least one lamp. The controller varies at least one of intensity and color temperature of light emitted by the at least one lamp at predetermined time intervals. The controller generates light source data that comprises at least one of intensity and color temperature of light emitted by the at least one lamp and timing of at least one of intensity and color temperature of light emitted by the at least one lamp. The system also includes a transmitter for transmitting a signal comprising the light source data and a digital imaging device. The digital imaging device comprises a shutter release, a receiver for receiving the signal from the light source, and a processor processing the light source data for determining at least one of intensity and color temperature and timing of intensity and color temperature of light emitted by the light source for generating exposure data. The exposure data includes when to commence capturing an image of a desired exposure and color temperature and at least one of shutter speed and aperture of the digital imaging device for achieving the desired exposure of the image. The digital imaging device also includes a display for displaying the exposure data to a user for allowing the user to select when to actuate the shutter release for capturing the image with the desired color temperature and exposure for selecting at least one of shutter speed and aperture of the digital imaging device for achieving the desired color temperature and exposure of the image.

In further embodiment, a method that comprises providing a light source comprising at least one lamp capable of emitting light at different intensities and color temperatures, varying at least one of intensity and color temperature of light emitted by the light source at predetermined time intervals, and generating light source data comprising at least one of intensity and color temperature of light emitted by the light source and timing of at least one of intensity and color temperature of light emitted by the light source. The method continues with providing a digital imaging device. The digital imaging device receives a signal comprising the light source data, processes the light source data for generating exposure data. The exposure data includes when to commence capturing at least one image of a desired color temperature and exposure and at least one of shutter speed and aperture of the digital imaging device. The method continues with displaying the exposure data to a user for allowing the user to select when to actuate a shutter release of the digital imaging device for capturing the at least one image with the desired color temperature and exposure and for selecting at least one of shutter speed and aperture of the digital imaging device for achieving the desired color temperature and exposure of the at least one image.

In further embodiment, a method that comprises providing a light source comprising at least one lamp capable of emitting light at different intensities and color temperatures, varying at least one of intensity and color temperature of light emitted by the light source at predetermined time intervals, and then generating light source data comprising at least one of intensity and color temperature of light emitted by the light source and timing of at least one of intensity and color temperature of light emitted by the light source. The method continues with providing a digital imaging device. The digital imaging device receives a signal comprising the light source data and continuously processes the light source data for continuously generating exposure data. The exposure data comprises different determined points in time to commence capturing at least one image of a desired color temperature and exposure and at least one of shutter speed and aperture of the digital imaging device. The method continues with displaying the exposure data to a user for allowing the user to select different determined points in time to actuate a shutter release of the digital imaging device for capturing the at least one image with the desired color temperature and exposure and for selecting at least one of shutter speed and aperture of the digital imaging device for achieving the desired color temperature and exposure of the at least one image, selecting at least one of a plurality of different shutter speeds and a plurality of different apertures of the digital imaging device. The method then continues with actuating the shutter repeatedly at different determined points in time, where each actuation of the shutter with at least one of a selected one of the plurality of different shutter speeds and plurality of different apertures for generating a plurality of images with different desired color temperatures and exposures, and then combining data from the plurality of images with different desired exposures and color temperatures for creating an image file comprising full spectrum color temperature information.

BRIEF DESCRIPTION OF THE SEVERAL VIEWS OF THE DRAWINGS

FIG. 5 is a simplified diagrammatic view of an exemplary digital image and digital camera in accordance with an embodiment of the invention;

FIG. 6 illustrates a greatly enlarged view of a portion of the digital image of FIG. 5;

DETAILED DESCRIPTION

Figure 1:
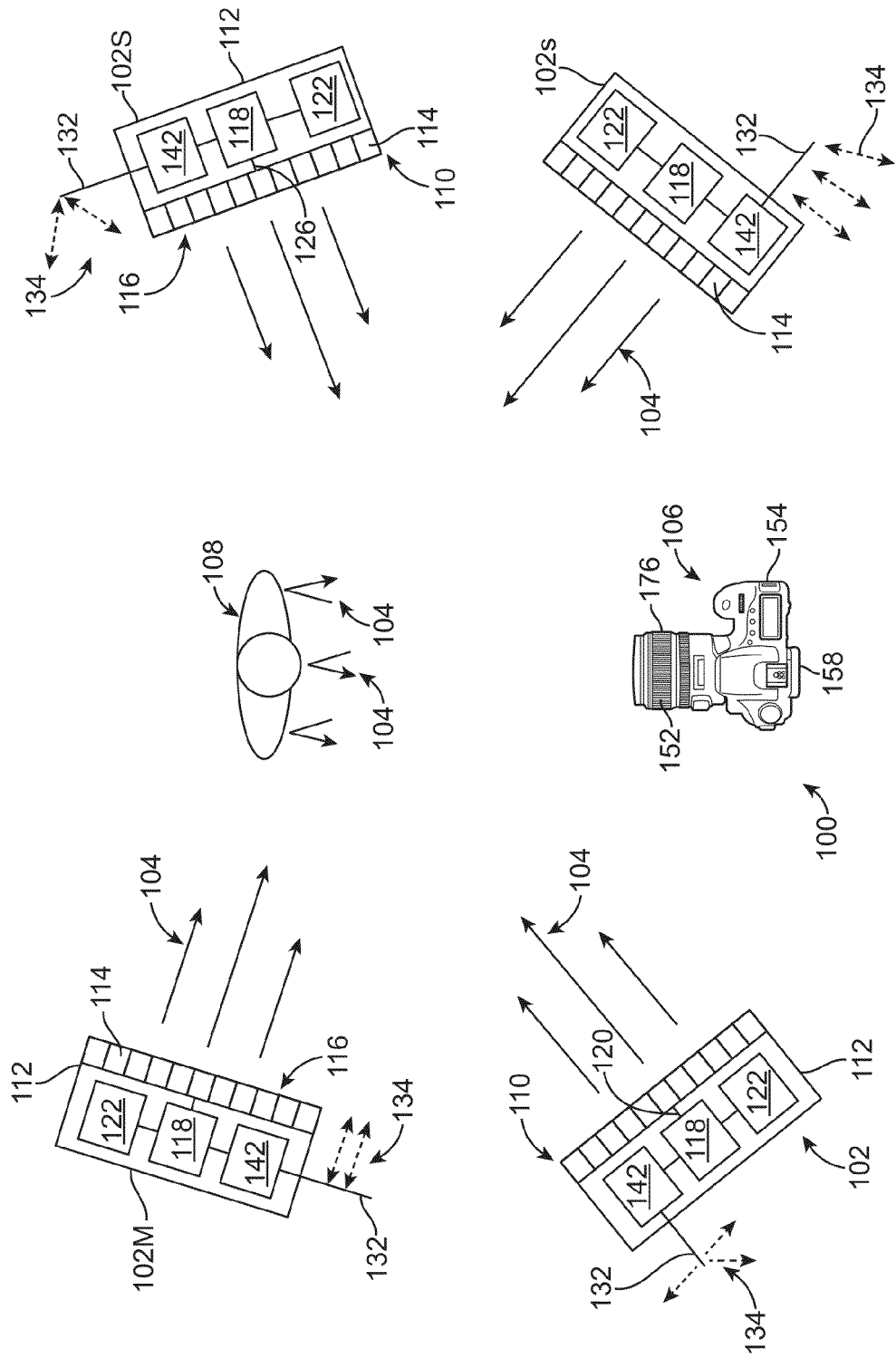
FIG. 1 illustrates a system for photographic exposure via real-time broadcast of lighting parameters accordingly to an exemplary embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

In one embodiment, a system includes a controller that varies at least one of intensity and color temperature of light emitted by the light source and generates light source data that comprises at least one of intensity and color temperature of light emitted by the light source and comprising timing of at least one of intensity and color temperature of light emitted by the light source. The system also includes a digital imaging device that comprises a shutter, a receiver for receiving a signal from the light source comprising the light source data, and a processor. The processor processes the light source data for capturing an image having at least one of a known intensity and color temperature of light for achieving a desired exposure of the image.

In another embodiment a system that includes a controller. The controller varies at least one of intensity and color temperature of light emitted by the light source and generates light source data comprising at least one of intensity and color temperature of light emitted by the light source and comprising timing of at least one of intensity and color temperature of light emitted by the light source. The system also includes a digital imaging device that comprises a shutter, a receiver for receiving a signal from the light source comprising the light source data, and a processor processing the light source data for determining a point in time to capture an image having at least one of a desired intensity and color temperature of light for achieving a desired exposure of the image and for generating exposure information. The digital imaging device also includes a display for displaying the exposure information allowing a user to select when to actuate the shutter to capture the image with the desired exposure and color.

In another embodiment, a system that comprises a light source. The light source comprises at least one lamp capable of emitting at least one of light at different intensities and light at different color temperatures. The system also comprises a controller for controlling at least one of intensity and color temperature of light emitted by the at least one lamp. The controller varies at least one of intensity and color temperature of light emitted by the at least one lamp at predetermined time intervals. The controller generates light source data that comprises at least one of intensity and color temperature of light emitted by the at least one lamp and timing of at least one of intensity and color temperature of light emitted by the at least one lamp. The system also includes a transmitter for transmitting a signal comprising the light source data and a digital imaging device. The digital imaging device comprises a shutter release, a receiver for receiving the signal from the light source, and a processor processing the light source data for determining at least one of intensity and color temperature and timing of intensity and color temperature of light emitted by the light source for generating exposure data. The exposure data includes when to commence capturing an image of a desired exposure and color temperature and at least one of shutter speed and aperture of the digital imaging device for achieving the desired exposure of the image. The digital imaging device also includes a display for displaying the exposure data to a user for allowing the user to select when to actuate the shutter release for capturing the image with the desired color temperature and exposure, and for selecting at least one of shutter speed and aperture of the digital imaging device for achieving the desired color temperature and exposure of the image.

In further embodiment, a method that comprises providing a light source comprising at least one lamp capable of emitting light at different intensities and color temperatures, varying at least one of intensity and color temperature of light emitted by the light source at predetermined time intervals, and generating light source data comprising at least one of intensity and color temperature of light emitted by the light source and timing of at least one of intensity and color temperature of light emitted by the light source. The method continues with providing a digital imaging device. The digital imaging device receives a signal comprising the light source data, processes the light source data for generating exposure data. The exposure data includes when to commence capturing at least one image of a desired color temperature and exposure and at least one of shutter speed and aperture of the digital imaging device. The method continues with displaying the exposure data to a user for allowing the user to select when to actuate a shutter release of the digital imaging device for capturing the at least one image with the desired color temperature and exposure and for selecting at least one of shutter speed and aperture of the digital imaging device for achieving the desired color temperature and exposure of the at least one image.

In further embodiment, a method that comprises providing a light source comprising at least one lamp capable of emitting light at different intensities and color temperatures, varying at least one of intensity and color temperature of light emitted by the light source at predetermined time intervals, and then generating light source data comprising at least one of intensity and color temperature of light emitted by the light source and timing of at least one of intensity and color temperature of light emitted by the light source. The method continues with providing a digital imaging device. The digital imaging device receives a signal comprising the light source data and continuously processes the light source data for continuously generating exposure data. The exposure data comprises different determined points in time to commence capturing at least one image of a desired color temperature and exposure and at least one of shutter speed and aperture of the digital imaging device. The method continues with displaying the exposure data to a user for allowing the user to select different determined points in time to actuate a shutter release of the digital imaging device for capturing the at least one image with the desired color temperature and exposure and for selecting at least one of shutter speed and aperture of the digital imaging device for achieving the desired color temperature and exposure of the at least one image, selecting at least one of a plurality of different shutter speeds and a plurality of different apertures of the digital imaging device. The method then continues with actuating the shutter repeatedly at different determined points in time, where each actuation of the shutter with at least one of a selected one of the plurality of different shutter speeds and plurality of different apertures for generating a plurality of images with different desired color temperatures and exposures, and then combining data from the plurality of images with different desired exposures and color temperatures for creating an image file comprising full spectrum color temperature information.

As will be appreciated by one skilled in the art, aspects of the present invention may be embodied as a system or method. Accordingly, embodiments of the present invention may take combine software and hardware and may generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

For purposes of describing the embodiments disclosed herein, two elements are considered to be coupled when one element is able to send an electrical signal to another element. The electrical signal may represent, for example but not limited to, data, operating commands, status information, or electrical power, or any combination of these electrical signals. A coupling may be implemented by wired or wireless connection means.

Figure 2:
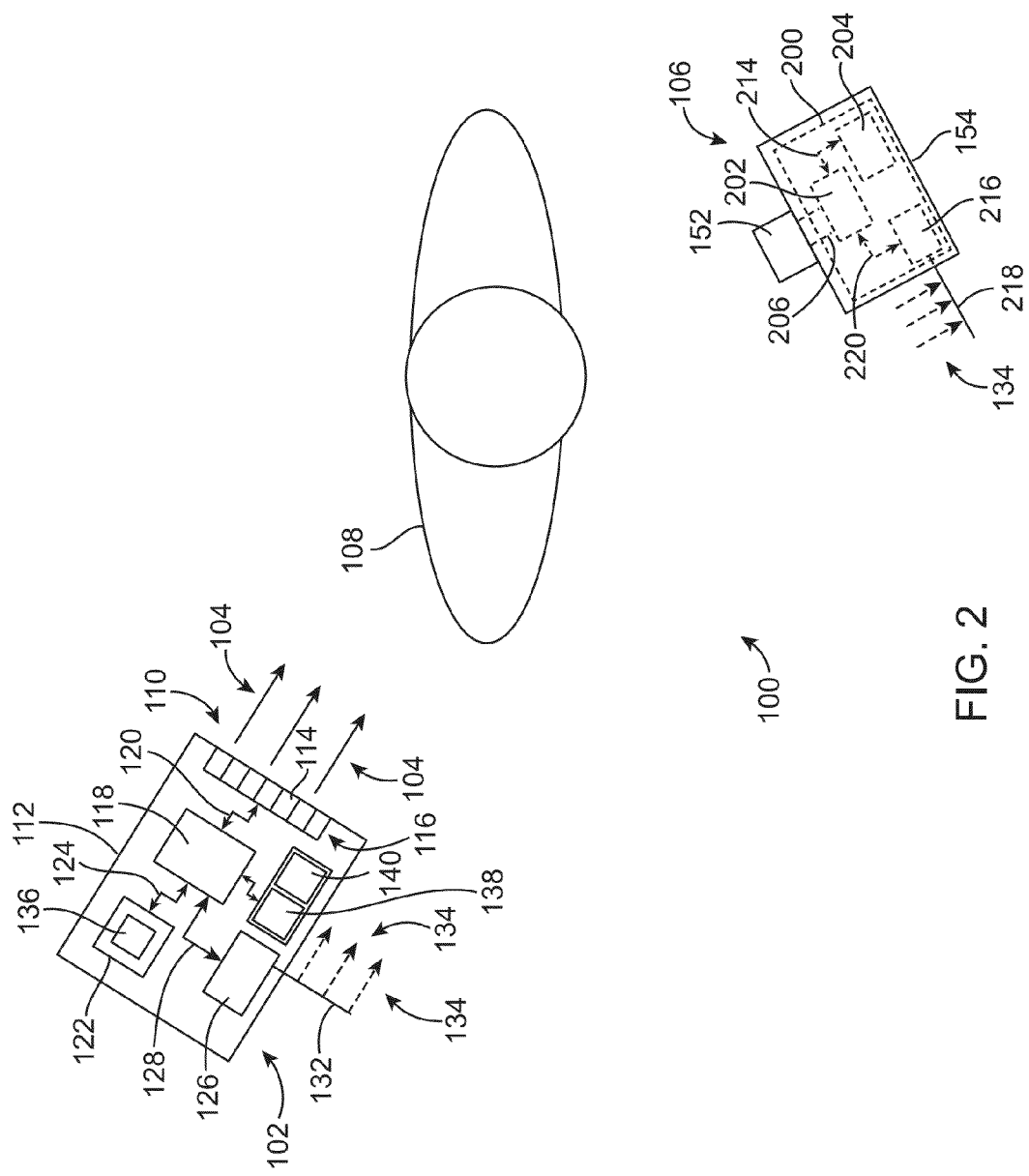
FIG. 2 is a simplified diagrammatic view of a light source and digital camera in accordance with an embodiment of the invention.

Referring now to FIG. 1 and FIG. 2 of the drawings, there is shown generally at 100 an exemplary embodiment of a system for photographic exposure via real-time broadcast of lighting parameters. In some embodiments, the system 100 includes at least one light source 102 that emits light 104 in variations of least one of intensity and color temperature and broadcasts data in real time descriptive of those variations. These data are received by an imaging device 106 that uses the data to adjust exposure settings to match the instantaneous lighting conditions at the time of exposure.

Color temperature is defined as the temperature of a blackbody radiator at which it would emit radiation of the same color as a given object, and is measured in degrees Kelvin. Color temperature ranges from about 1,500K to about 8,000K. Color temperatures over 5,000K become blue-white and are called cool colors, while color temperatures in the range of about 2,700K-3,000K become yellow-white to red and are called warm colors. The intensity of light can be measured using any one of several known measurements including foot-candles, lumens, candela, watts, and lux, among several known measurements. As used herein, color temperature refers to electromagnetic radiation emitted at any given point in time and in various and varying wavelengths that are visible to the human eye, and which is characteristically measured as noted above. The spectrum of color temperatures may not be defined by any single, given color temperature.

As shown in FIG. 1 and FIG. 2, the system 100 includes at least one light source 102 that emits light 104 in variations of intensity and color temperature and broadcasts data (to be discussed thoroughly hereinafter) in real time, descriptive of those variations. In some embodiments, the system 100 may include more than one light source, shown generally at 102 in FIG. 1. Any number of light sources 102 may be used in the embodiments for illuminating a subject 108 as desired by a user, such as a photographer (not shown). Four light sources 102 are shown in the FIG. 1 for ease of discussion only.

Figure 3:
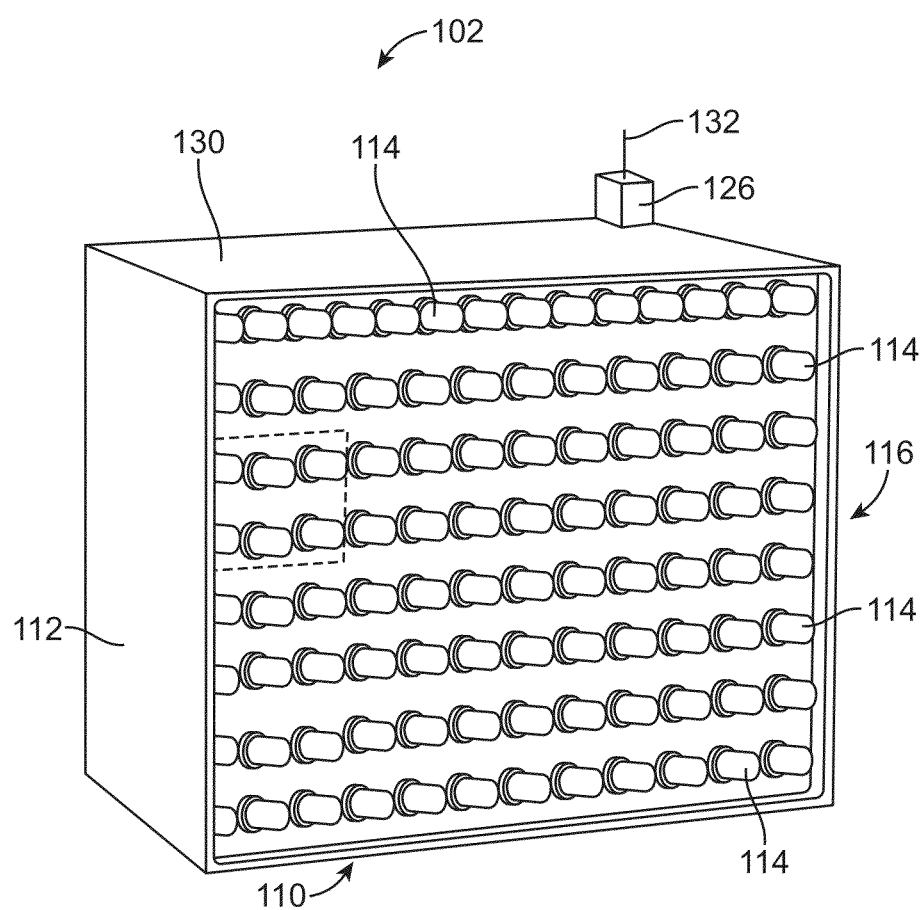
FIG. 3 is a simplified diagrammatic view of a light source accordance with an embodiment of the invention.

As shown in FIGS. 1-3, in some preferred embodiments, each light source 102 comprises at least one light-emitting lamp, shown generally at 110, retained in a housing 112. In some embodiments, the lamp 110 is capable of either emitting light 104 at different color temperatures or emitting light 104 at different intensities. In preferred embodiments, the lamp 110 is capable of both emitting light 104 throughout a range of color temperatures and at different intensities.

In some preferred embodiments, the lamp 110 may comprise any suitable light-emitting device that is capable of emitting light 104 throughout a range of color temperatures, ranging from about 2,500K to about 10,000K. Additionally, in preferred embodiments, the lamp 110 is capable of rapidly changing the color temperature of light 104 being emitted. For example, if the lamp 110 is emitting light 104 at a color temperature of 4,500K, the lamp 110 can be rapidly, and preferably instantaneously, adjusted to emit light 104 at a different color temperature, such as 6,500K for example.

The lamp 110 may also preferably comprise any suitable light-emitting device that is capable of emitting light 104 at different intensities. For example, the lamp 110 preferably comprises a light-emitting device 114 where adjusting power to lamp 110, by known means, controls the intensity of light 104 emitted by the lamp 110. The lamp 110 may comprise one or more light-emitting devices 114. In certain embodiments, the lamp 104 may comprise an array 116, or cluster, of light-emitting devices 114. In one preferred embodiment, the array 116 may comprise an array of Light-emitting Diodes (LEDs) 114.

Controlling the color temperature of light 104 emitted from the array 116 may be accomplished using any of several known methods. In one exemplary embodiment, all or a portion of the LEDs 114 comprising the array 116 comprise known RGB LEDs where each LED 114 is capable of emitting red, green, and blue light. A controller 118, seen in FIG. 2, is coupled to the array 116 for controlling the intensity and different color temperatures of light 104 emitted by the array 116. The controller 118 may adjust the color temperature and intensity of light 104 emitted by certain LEDs 114, by groups of LEDs 114, or by the array 116 as a whole, for controlling the intensity and color temperatures of light 104 emitted by the array 116.

In an alternative exemplary embodiment, predetermined LEDs 114 in the array 116 may comprise selected colors. The array 116 may contain LEDs 114 that emit only red light, LEDs 114 that emit only green light, LEDs 114 that emit only blue light, and LEDs 114 that emit only white light, for example. The controller 118 may then activate, or deactivate, and/or adjust the intensity of light emitted by certain LEDs 114, by groups of LEDs 114, or by the array 116 as a whole, for controlling the intensity and color temperatures of light 104 emitted by the array 116.

Referring to FIGS. 1-3, and particularly to FIG. 2, the controller 118 in each light source 102 is connected to the array 116 by an array data bus 120. In an exemplary embodiment, the controller 118 may comprise a Central Processor Unit (CPU) and is coupled to a memory 122 via memory data and address lines 124. The controller 118 preferably comprises a processor suitable for processing data and controlling the lamp 110, which may comprise the array 116. In the embodiments, the memory 122 may comprise a suitable data storage device known in the art. The memory 122 may comprise either volatile or non-volatile memory, or combinations thereof, for example.

In preferred embodiments, each light source 102 further comprises a transmitter 126 coupled to the controller 118 via data lines 128. In some embodiments, the transmitter 126 may be retained in the light source's housing 112, or alternatively, the transmitter 126 may be coupled to an exterior 130 of the housing 112 (shown in FIG. 3). Optionally, the transmitter 126 may be located remotely and coupled to the controller 118 either wired or wirelessly, as known in the art (not shown). In preferred embodiments, an antenna 132 is coupled to the transmitter 126 and positioned such that the antenna 132 may broadcast signals 134 without interference.

The transmitter 126 transmits signals 134, that preferably comprise data, to the imaging device 106 via the antenna 132. In exemplary embodiments, the transmitter 126 may comprise any known signal transmitting device capable of wireless data transmission. One exemplary transmitter 126 may comprise a known infrared signal transmitter for transmitting infrared signals. In another embodiment, the transmitter 126 may comprise a known Wi-Fi® transmitter. "Wi-Fi" is a trademark of Wi-Fi Alliance, Austin, Tex. In such an embodiment, the Wi-Fi® transmitter 126 transmits data wirelessly using radio frequency signals. Thus, the transmitter 126 may comprise any known, suitable wireless signal transmitting device capable of data transmission, in exemplary embodiments of the invention.

As shown in FIGS. 1-3, in use, the lamp 110 which may comprise the array 116, emits light 104 at a predetermined color temperature and intensity. In some preferred embodiments, the color temperature and intensity of the light 104 emitted by the light source 102 may be determined by a set of instructions, such as a computer program 136, stored in memory 122. In some preferred embodiments, the computer program 136 may also control points in time that the one or more light sources 102 emit light 104 at specific color temperatures and intensities. The computer program 136 may also determine the time duration that the one or more light sources 102 emit light 104 at the predetermined color temperature and intensity, and when either the color temperature or intensity of light 104 emitted by the light sources 102 is to be adjusted and what is the next color temperature and/or light intensity of light 104 emitted by the light sources 102.

In some embodiments, the controller 118 may run the program 136 for controlling the color temperature and intensity of light 104 emitted by the array 116. The controller 118 may adjust at least one of the color temperature and intensity of light 104 emitted by the array 116 for illumining the subject 108 with light 104 of a desired color temperature, or range of color temperatures, and intensity. The light-emitting devices 114 comprising the array 116 are capable of instantaneously changing at least one of the color temperature and intensity of light 104 they emit, enabling the array 116 to emit light 104 at the color temperature and intensity during the time period determined by the computer program 136.

As the computer program 136 is running, the controller 118 is simultaneously sending color temperature data 138 and light intensity data 140 to the transmitter 126. The transmitter 126 then transmits signals, which comprise data transmission signals 134 to the imaging device 106. The imaging device 106 uses the color temperature data 138 and light intensity data 140 to adjust its exposure settings to match the lighting conditions at the time of exposure, thoroughly discussed hereinafter.

In some optional embodiments, the color temperature and intensity of the light 104 emitted by the light sources 102 may be determined by a user, which may comprise a photographer or technician (both not shown). The user may directly control the controller 118, as known in the art, or invoke the computer program 136, or utilize other known means for controlling the controller 118 to instruct the array 116 of each light source 102 to emit light 104 at color temperatures and intensities desired by the user. The user can also control the controller 118 to instruct the array 116 of each light source 102 to instantaneously change at least one of the color temperature and intensity of light 104 they emit, enabling the array 116 to emit light 104 throughout a range of color temperatures and intensities during the time period desired by the user.

As shown in FIG. 1, in some optional embodiments, one light source 102M may control one or more other light sources 102S. In such an embodiment, the controlling light source 102M comprises a so-called "master" light source, while the controlled light sources 102S comprise so-called "slave" light sources. In this embodiment, the master light source 102M optionally embodies a transceiver 142 for both sending and receiving signals 134. The master light source 102M additionally embodies a controller 118, memory 122, and antenna 132, as discussed previously. The master light source 102M may transmit instructions to the slave light sources 102S and may receive color temperature data 138 and light intensity data 140 from the slave light sources 102S. The master light source 102M may then transmit data transmission signals 134 to the imaging device 106.

Additionally in this embodiment, the slave light sources 102S may also optionally embody a transceiver 142 for both sending and receiving signals 134. The slave light sources 102S may receive instructions from the master light source 102M and then emit light 104 with the color temperature and intensity determined by controller 118 of the master light source 102M. The slave light sources 102S may then transmit color temperature data 138 and light intensity data 140 to the master light source 102M for processing by its controller 118. Optionally, the slave light sources 102S may transmit data transmission signals 134 directly to the imaging device 106.

As shown in FIGS. 1, 4-8C, the exemplary digital imaging device 106 is capable of capturing digital images, shown generally at 144. As discussed herein a digital image, or simply image 144, is a numeric representation of a two-dimensional image that is captured by the digital imaging device 106. A digital image 144 has a finite set of digital values, called picture elements or pixels 146, shown in FIG. 6. Pixels 146 are the smallest individual element in an image 144 holding quantized values that represent the brightness of a given color at any specific point, as is known in the art. The quantity of pixels 146 in an image 144 may be determined by the quantity of photo detectors 148 that comprise an electronic image sensor 150 in the digital imaging device 106, shown in FIG. 7. Thus, an image 144 created by a 12.3 megapixel image sensor 150 comprises more pixels 146 than an image 144 created by 8 megapixel image sensor 150.

Referring particularly to FIGS. 5-8, in some embodiments, the digital imaging device 106 may comprise a known digital camera. In preferred embodiments, the digital imaging device 106 may comprise a known digital single-lens reflex camera, known in the art as a digital-SLR, or more commonly, "DSLR." The DSLR 106 is a camera that takes photographs by recording digital images 144 on the electronic image sensor 150. As referred to herein, it is to be understood that the image sensor 150 is a device that receives an optical image and converts the image into an electronic signals, as known in the art. When light 104 strikes the image sensor 150 it is held as a small electrical charge in each photo detector 148 of the sensor 150. The electrical charges are then converted to voltage one photo detector 148 at a time as they are read from the sensor 150. Additional circuitry in the DSLR 106 then converts the voltage into digital information, discussed hereinafter.

The DSLR 106 includes a lens 152 mounted on a body 154 of the camera 106. The lens 152 captures light 104 emitted by the one or more light sources 102 and reflected off of the subject 108. Light 104 travels through the lens 152, through a viewing system 156, and to a viewfinder 158 of the DSLR 106 to allow a photographer to view the subject 108 through the lens 152.

The DSLR 106 also includes a shutter 160 (best seen in FIG. 7), or other similar mechanism, actuated by a shutter release button 162, to control how long light 104 passing through the lens 152 can expose the sensor 150. In the prior art, once the shutter release button 162 is depressed, a movable mirror 164 is rotated upwardly and out of the light 104 and the shutter 160 is opened for a finite period of time. The image sensor 150 receives light 104 traveling through the lens 152 and absorbs the light 104 to expose the image 144 on the sensor 150. Light 104 is absorbed by the image sensor 150 as long as the shutter 160 is open. The period of time that the shutter 160 is open is known in the art as "shutter speed." Shutter speed is the effective length of time the camera's shutter 160 is open, where light 104 reaches the image sensor 150. Once the shutter 160 is closed, the mirror 164 is rotated downwardly to allow viewing of the subject 108 through the viewfinder 158. Optionally, the aperture 182 or speed of the shutter 160, or both, may be adjusted automatically by the DSLR 106, as is known in the art, for adjusting the exposure level of the image 144.

Images 144 recorded on the image sensor 150 are then stored on a removable memory card 166. The memory card 166 may comprise any suitable known electronic flash memory data storage device used for storing digital information, as is known in the art.

In some embodiments, a back side 168 of the DSLR 106, shown in FIG. 5 and FIGS. 8A-8C, may have an image display 170 for displaying images 144 captured by the DSLR 106. The image display 170 may also function as an electronic viewfinder for viewing the subject 108 before an image 144 is captured and saved.

A multi selector button 172 may be provided on the back side 168 of the DSLR 106. The multi selector button 172 allows for positioning and repositioning a cursor 174 on the image display 170 and for initiating an action after the cursor 174 has been moved to a selected position on the image display 170. In some embodiments, the multi selector button 172 may also be actuated to increase the magnification of the image 144, known in the art as "zoom in", to view a desired section of the digital image 144 more clearly.

Figure 4:
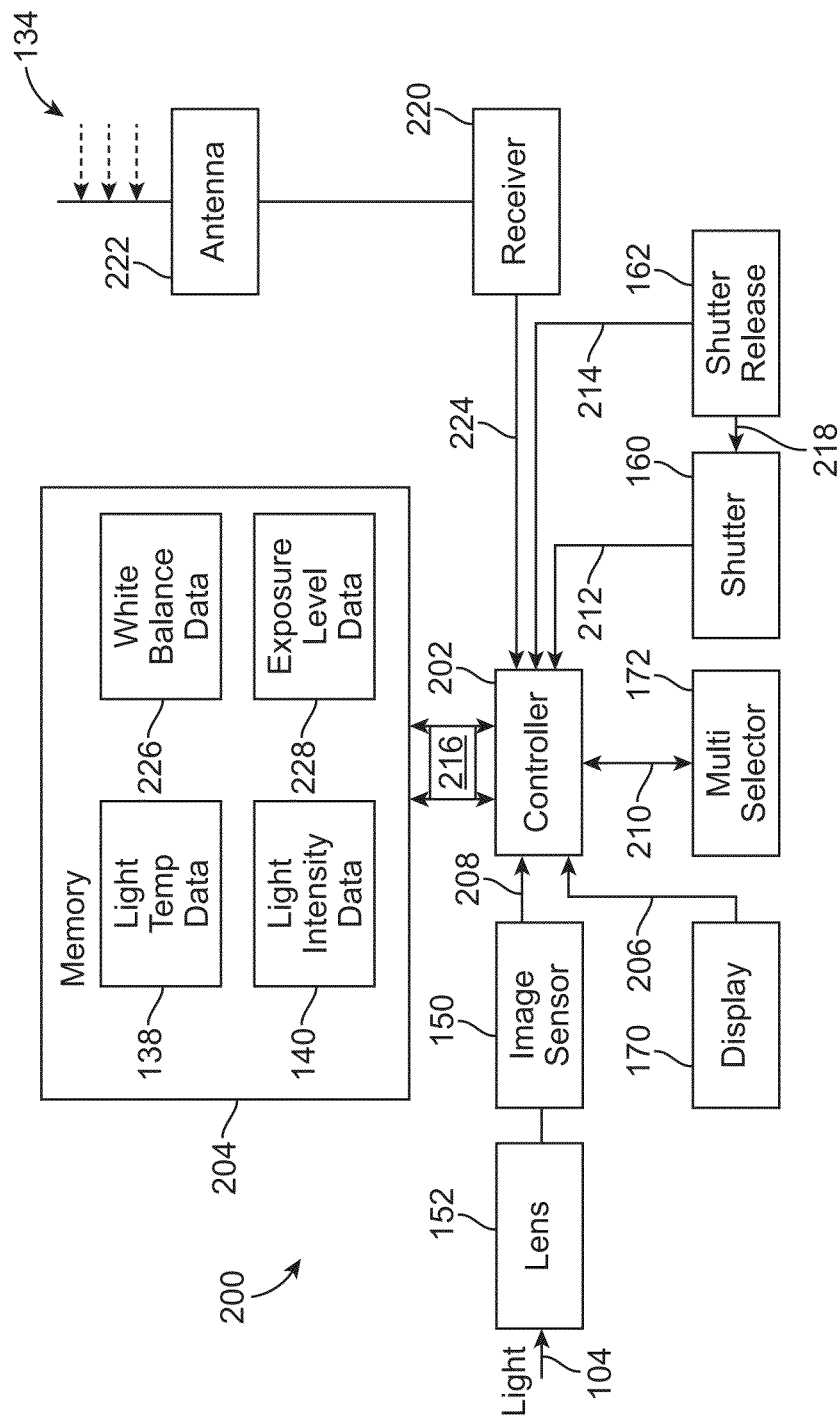
FIG. 4 illustrates a simplified block diagram of an image processing system in accordance with an embodiment of the invention.
Figure 7:
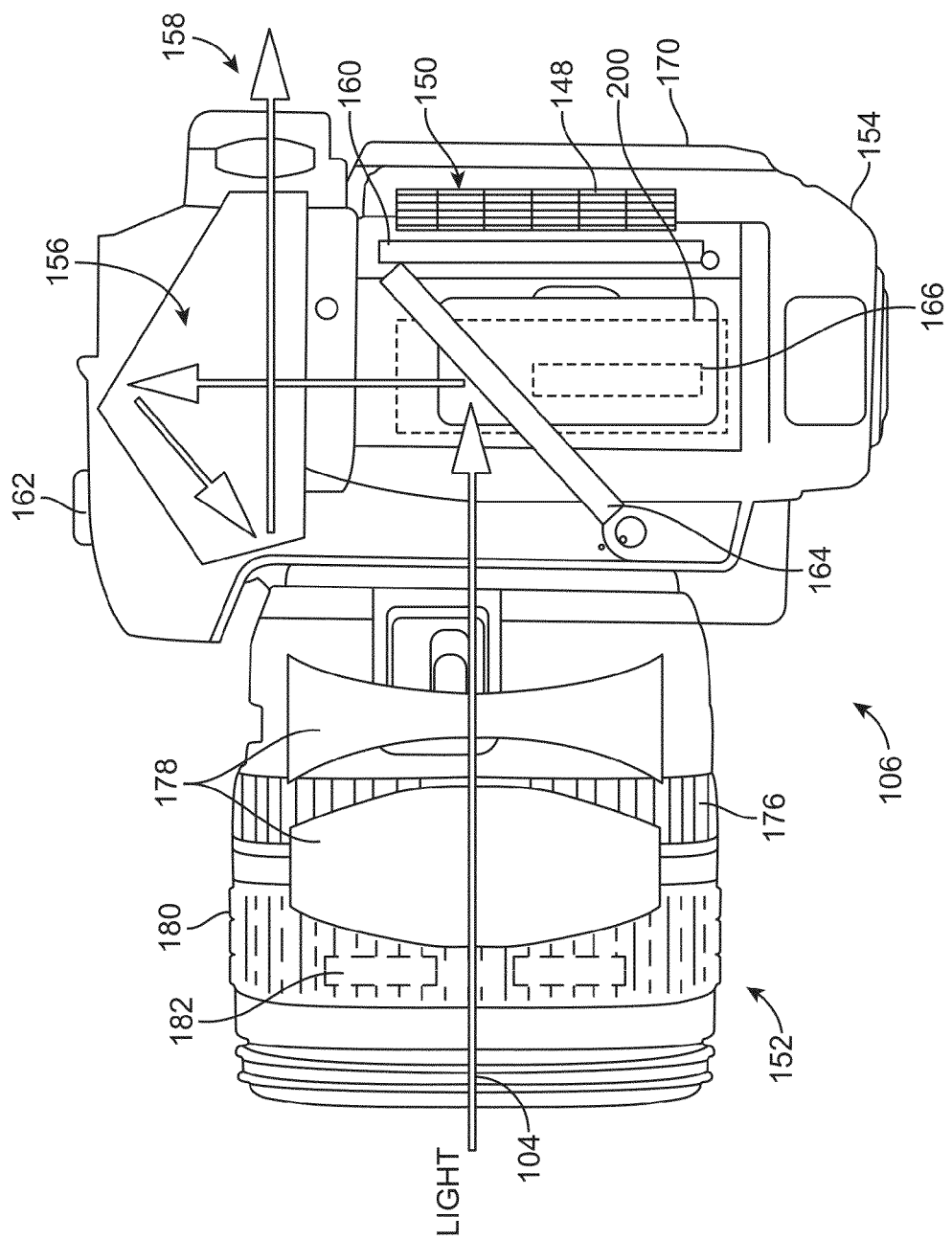
FIG. 7 is a simplified cutaway view of a digital camera in accordance with an embodiment of the invention.

Referring to the drawing Figures, and particularly to FIG. 2 and FIG. 4, the DSLR 106 includes an image processing system, shown generally at 200. The processing system 200 receives images 144 recorded on the image sensor 150, processes the images 144, and outputs them to the memory card 166. Processing of images 144 recorded on the image sensor 150 can comprise any of several different known image correction tasks, image output tasks, and many other image tasks. In some embodiments, these tasks may include: Bayer filtering, demosaicing, image sensor corrections or dark-frame subtraction, image noise reduction, image sharpening, image scaling, gamma correction, image enhancement, color-space conversion, chroma sub-sampling, frame-rate conversion, lens corrections, image compression, including JPEG encoding, and numerous other tasks.

In some embodiments, the image processing system 200 of the invention includes a controller 202, that may comprise a Central Processor (CPU), and a memory 204. In preferred embodiments, the controller 202 is connected to the image display 170 by a display data bus 206, to the image sensor 150 via data lines 208, to the multi selector button 172 via data lines 210, to the shutter 160 via data lines 212, to the shutter release button 162 via data lines 214, and to the memory 204 via memory data and address lines 216. Additionally, the shutter release button 162 is connected to the shutter 160 via data lines 218.

In some embodiments, the processing system 200 may additionally include a receiver 220 connected to an antenna 222 and to the controller 202 via data lines 224. The receiver 220 receives the data transmission signals 134 from at least one of the light sources 102 via the antenna 222, and then transmits the received data transmission signals 134 to the controller 202 for processing. The controller 202 processes the data transmission signals 134 as they are received to process the color temperature data 138 and light intensity data 140 embedded in the signals 134 to adjust its exposure settings to match the lighting conditions at the time of a given exposure.

Referring to the drawing Figures, the photographer prepares to capture a desired image, such as an image 144 of the subject 108. The photographer may first look through the DSLR's viewfinder 158 to view and compose the image 144 of the subject 108. They may rotate a focus ring 176, coupled to lens elements 178 of the lens 152 to bring the subject 108 into focus. They may also adjust an aperture ring 180 coupled to an aperture 182 of the lens 152 achieve a desired depth of field of the image 144 and/or to control how much light 104 enters the lens 152 for controlling the exposure level of the image 144. Once the photographer has their desired composition, they may adjust the speed of the shutter 160 to obtain the desired shutter speed. Optionally, the aperture 182 or speed of the shutter 160, or both, may be adjusted automatically by the DSLR 106, as is known in the art, for adjusting the exposure level of the image 144.

Another means for adjusting exposure level of the image 144 is "ISO." ISO relates to how sensitive the image sensor 150 is to the amount of light present. ISO is typically expressed in a numerical value such as: 100, 200, 400, 800 . . . , where the greater the ISO number, the more sensitive to light the sensor 150 becomes. For example, in situations where the photographer has a desired aperture 182 and shutter speed, to achieve a desired artistic effect for example, the ISO can be adjusted to expose the image 144 on the image sensor 150 as desired by the photographer. Optionally, the ISO of the sensor 150 is may be adjusted automatically by the DSLR 106.

As shown in FIGS. 1-3, lighting of the subject 108 is commenced when one or more light sources 102 are activated, as is known. The color temperatures and intensities of light 104 emitted by each light source 102, 102M, 102S are controlled by its controller 118, which may be processing instructions, either from the computer program 136 or received from a user, which may be a photographer or technician, or from the master light source 102M. The color temperature, or range of color temperatures of light 104 emitted by each light source 102, 102M, 102S may be different or similar to the color temperature of light 104 emitted by other light sources 102, 102M, 102S. Thus, the light sources 102, 102M, 102S may simultaneously emit light 104 having the same color temperature, or different color temperatures, or combinations thereof, where some light sources 102, 102M, 102S simultaneously emit light 104 having the same color temperature and other light sources 102, 102M, 102S simultaneously emit light 104 having the different color temperatures. Additionally, in some preferred embodiments, the color temperature of light 104 emitted by any or all of the light sources 102, 102M, 102S may be adjusted instantaneously to a different color temperature.

Similarly, the intensity of light 104 emitted by each light source 102, 102M, 102S, may be different or similar to the intensity of light 104 emitted by other light sources 102, 102M, 102S. Thus, the light sources 102, 102M, 102S may simultaneously emit light 104 having different intensities, and some light sources 102, 102M, 102S simultaneously emit light 104 having the same intensity and other light sources 102, 102M, 102S simultaneously emit light 104 having the different intensities. Additionally, in some preferred embodiments, the intensity of light 104 emitted by any or all of the light sources 102, 102M, 102S may be adjusted instantaneously to a different intensity.

As the light sources 102 are emitting light 104, data transmission signals 134 are constantly sent to the DSLR 106 from one or more light source 102, 102M, 102S. The DSLR's receiver 220 receives the signals 134 and its controller 202 continuously processes the color temperature data 138 and light intensity data 140 received in the signals 134. The controller 202 processes the color temperature data 138 for generating white balance data 226 for determining proper "white balance" of images 144 to be captured. In some optional embodiments, the color temperature data 138 and light intensity data 140 may be stored in memory 204. As discussed herein "white balance" is the process of removing unrealistic color casts, so that objects which appear white to the photographer, or other viewers of the subject 108, are rendered white in images 144 captured by the DSLR 106. Capturing images 144 with proper white balance also ensures that the images 144 created by the DSLR 106 are created with the same color temperature as the color temperature of light 104 illuminating the subject 108 when the image 144 was captured. In some embodiments, the white balance data 226 is then be displayed on the DSLR's display 170. In some optional embodiments, shown in FIG. 8B, the white balance data 226 may then be displayed on the DSLR's display 170 simultaneously with the image 144, and prior to the image 144 being captured by the DSLR 106.

In preferred embodiments, as the controller 202 is continuously processing the color temperature data 138 for generating white balance data 226, the controller 202 is simultaneously continuously processing the light intensity data 140 for generating exposure level data 228. In some embodiments, the exposure level data 228 may then be displayed on the DSLR's display 170. In some optional embodiments, the exposure level data 228 may then be displayed on the DSLR's display 170 simultaneously with the image 144, prior to the image 144 being captured by the DSLR 106. In some optional embodiments, shown in FIG. 8C, the exposure level data 228 and white balance data 226 may then be displayed on the DSLR's display 170 simultaneously with the image 144, prior to the image 144 being captured by the DSLR 106.

Optionally, the DSLR 106 continuously displays the exposure level data 228 and white balance data 226 on the DSLR's display 170 for viewing by the photographer. The photographer then utilizes the exposure level data 228 and white balance data 226 to determine a point in time to capture an image 144 having the exposure level and white balance desired by the photographer. Once the photographer has determined a point in time to capture an image 144 having the desired exposure level and white balance, the photographer depresses the shutter release button 162, which signals the controller 202 of the desired shutter actuation via data lines 214. The controller 202 then processes the white balance data 226 and exposure level data 228, along the color temperature data 138 and light intensity data 140 from the light sources 102, and determines the point in time where the actuating the shutter 160 for a determined time period, affords capturing an image 144 having the exposure level and white balance desired by the photographer indicated by depressing the shutter release button 162. The controller 202 then actuates the shutter 160 at the determined the point in time and for the determined time period, to capture an image 144 having the exposure level and white balance desired by the photographer.

In an optional embodiment, once the photographer has determined a point in time to capture an image 144 having the desired exposure level and white balance, the photographer depresses the shutter release button 162, which signals the controller 202 of the desired shutter actuation. The controller 202 then processes the desired shutter actuation, along with the color temperature data 138 and light intensity data 140 from the light sources 102 and determines the point in time where the actuating the shutter 160 for a determined time period, affords capturing an image 144 having the exposure level and white balance desired by the photographer. The controller 202 then actuates the shutter 160 more than once, with the first shutter actuation occurring at the determined the point in time. The controller 202 actuates the shutter 160 more than once, and up to a plurality of instances, for capturing a plurality of images 144. The exposures are timed to integrate a fuller spectrum of light 104 than is captured during a single image 144. In some embodiments, the some or all of the plurality of images are combined, as known in the art, to create a single image 144.

Figure 8A:
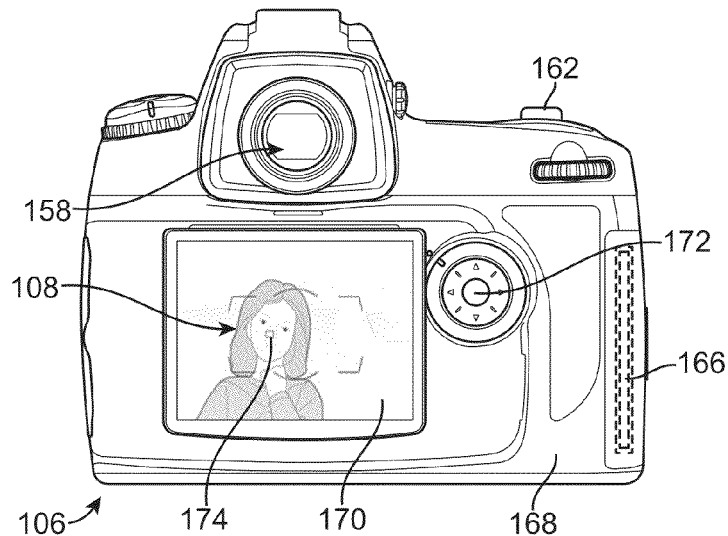
FIGS. 8A-8C are simplified views showing an exemplary digital image and pertinent information displayed on a display of the digital camera in accordance with an embodiment of the invention.
Figure 8B:
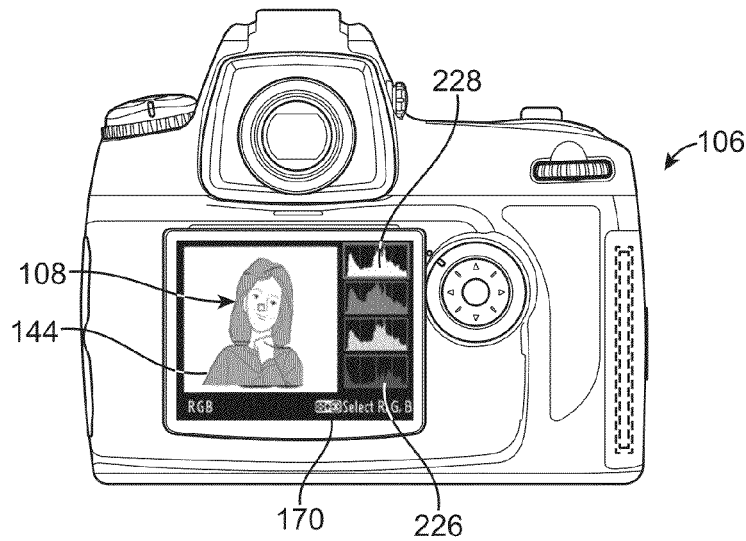
Figure 8C:
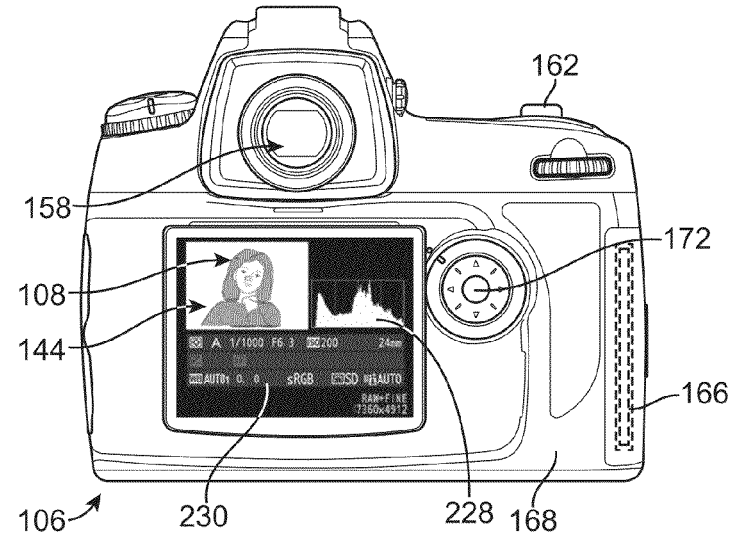

In some optional embodiments, shown in FIG. 8C, as the image 144 is recorded on the image sensor 150, metadata 230 regarding the image 144 may also be recorded along with the image 144. Exemplary metadata 230 regarding the image 144 may include exposure information, information as to the type of camera that created the image 144, lens used, white balance, color temperature, aperture and shutter speed settings, copyright information, and other pertinent information regarding the image 144. Some of the metadata 230 may facilitate editing the image 144 during post-processing.

Figure 9:
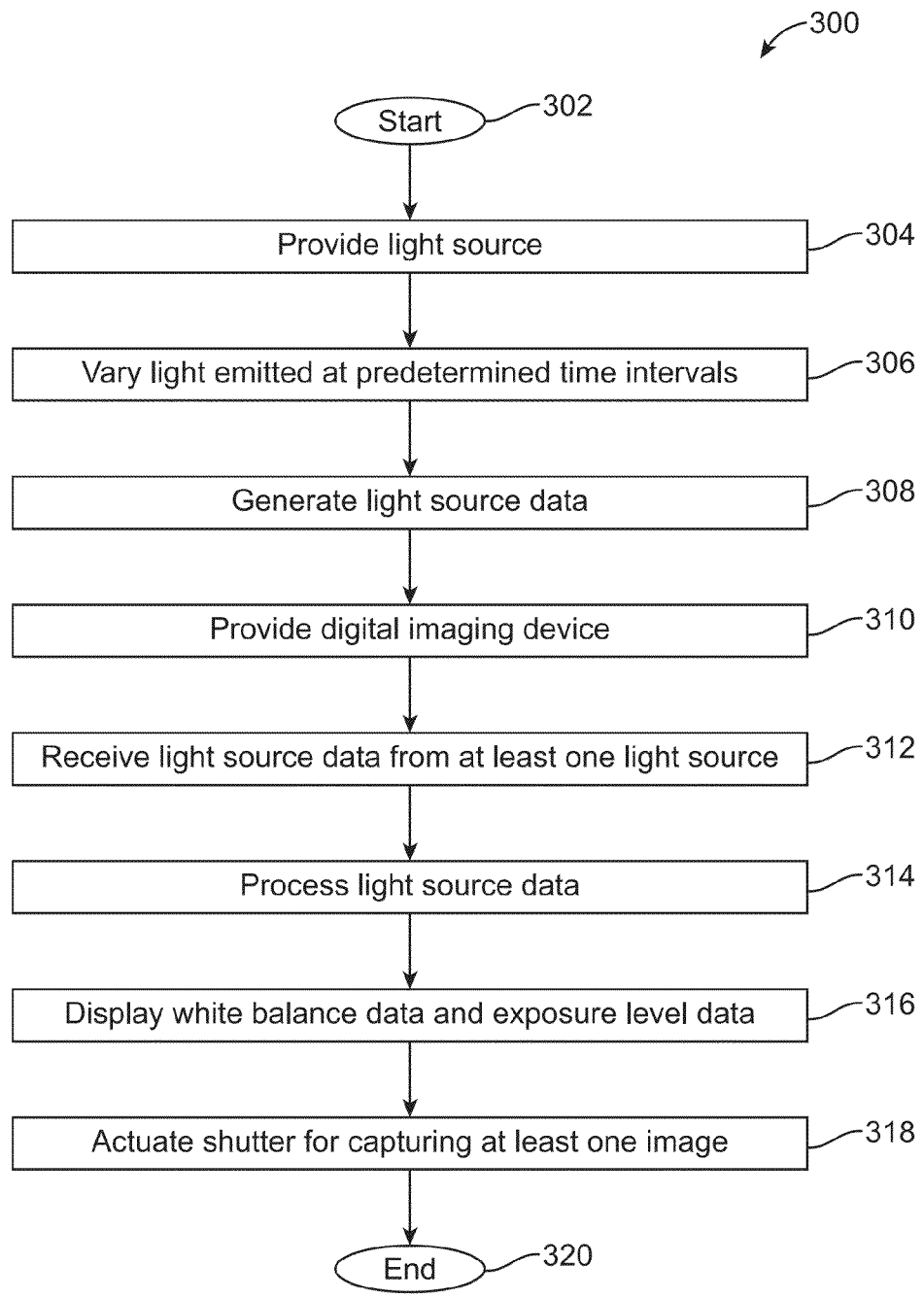
FIG. 9 is a flowchart showing an exemplary process for photographic exposure via real-time broadcast of lighting parameters accordingly to an exemplary embodiment of the invention.

Referring to FIGS. 1-9, and particularly to FIG. 9, a flow diagram of an exemplary embodiment of a process for controlling photographic exposure via real-time broadcast of lighting parameters in accordance with the invention, is shown generally at 300. The process 300 starts with start block 302. In process block 304, at least one light source 102 that comprises at least one lamp 110 capable of emitting light 104 at different intensities and color temperatures is provided. In process block 306, at least one of intensity and color temperature of light 104 emitted by the light source 102 is varied at predetermined time intervals. Light source data, which comprises at least one of color temperature data 138 and light intensity data 140 is generated by the controller 118 of at least one light source 102, in process block 308. In process block 310 a digital imaging device, such as the DSLR 106, is provided and in process block 312 the digital imaging device receives a signal 134 comprising the light source data 138, 140. In process block 314, the DSLR 106 continuously processes the light source data 138, 140 for continuously generating exposure data that comprises white balance data 226 and exposure level data 228.

At least one of the white balance data 226 and exposure level data 228 is displayed on the DSLR's display 170 in process block 316. The white balance data 226 and/or exposure level data 228 is displayed on the DSLR's display 170 for allowing the user to select different determined points in time to actuate the shutter release 162 of the DSLR 106 for capturing the at least one image 144 with the desired color temperature and exposure and for selecting at least one of speed of the shutter 160 and aperture 182 of the DSLR 106 for achieving the desired color temperature and exposure of the at least one image 144. In process block 318, the shutter release button 162 is pressed to actuate the shutter 160. The controller 202 processes the white balance data 226 and exposure level data 228, along the color temperature data 138 and light intensity data 140 from the light sources 102, and determines the point in time where the actuating the shutter 160 for a determined time period, affords capturing an image 144 having the exposure level and white balance desired by the photographer indicated by depressing the shutter release button 162. The controller 202 then actuates the shutter 160 at the determined point in time and for the determined time period, to capture an image 144 having the exposure level and white balance desired by the photographer.

Optionally, the controller 202 then actuates the shutter 160 more than once, with the first shutter actuation occurring at the determined the point in time. The controller 202 actuates the shutter 160 more than once, and up to a plurality of instances, for capturing a plurality of images 144. The process 300 then ends with end block 320.

Those skilled in the art will appreciate that various adaptations and modifications can be configured without departing from the scope and spirit of the embodiments described herein. Therefore, it is to be understood that, within the scope of the appended claims, the embodiments of the invention may be practiced other than as specifically described herein.

What is claimed is:

1. A system comprising:
    a light source including a controller, the controller:
        varying at least one of intensity and color temperature of light emitted by the light source;
        generating light source data comprising at least one of intensity and color temperature of light emitted by the light source and comprising timing of at least one of intensity and color temperature of light emitted by the light source; and
    a digital imaging device, digital imaging device comprising:
        a shutter;
        a receiver for receiving a signal from the light source comprising the light source data; and
        a processor processing the light source data for capturing an image having at least one of a known intensity and color temperature of light for achieving a desired exposure of the image, wherein the processor processes the light source data for determining when to actuate the shutter to capture an image having at least one of a known color temperature of light and a desired intensity of light.

2. The system of claim 1, wherein the processor controls at least one of a speed of the shutter and an aperture of the digital imaging device.

3. The system of claim 1, wherein the processor stores the light source data with metadata of each image captured.

4. A system comprising:
    a light source including a controller, the controller:
        varying at least one of intensity and color temperature of light emitted by the light source;
        generating light source data comprising at least one of intensity and color temperature of light emitted by the light source and comprising timing of at least one of intensity and color temperature of light emitted by the light source; and
    a digital imaging device, digital imaging device comprising:
        a shutter;
        a receiver for receiving a signal from the light source comprising the light source data;
        a processor processing the light source data for determining a point in time to capture an image having at least one of a known intensity and color temperature of light for achieving a desired exposure of the image and for generating exposure information; and
        a display for displaying the exposure information allowing a user to select when to actuate the shutter to capture the image with the desired exposure and color.

5. The system of claim 4, wherein the processor processes the light source data for generating exposure information for determining when to actuate the shutter to capture an image having at least one of a desired color temperature of light and a desired intensity of light.

6. The system of claim 5, wherein the processor controls at least one of a speed of the shutter, and an aperature, and ISO of the digital imaging device.

7. A system comprising:
    a light source, the light source comprising:
        at least one lamp, the lamp capable of emitting at least one of light at different intensities and light at different color temperatures;
        a controller for controlling at least one of intensity and color temperature of light emitted by the at least one lamp, the controller varying at least one of intensity and color temperature of light emitted by the at least one lamp at predetermined time intervals, the controller generating light source data, the light source data comprising at least one of intensity and color temperature of light emitted by the at least one lamp, and timing of at least one of intensity and color temperature of light emitted by the at least one lamp; and
        a transmitter for transmitting a signal comprising the light source data; and
    a digital imaging device, digital imaging device comprising:
        a shutter release;
        a receiver for receiving the signal from the light source;
        a processor processing the light source data for determining at least one of intensity and color temperature and timing of intensity and color temperature of light emitted by the light source for generating exposure data, the exposure data including when to commence capturing an image of a known exposure and color temperature and at least one of shutter speed and aperture of the digital imaging device for achieving the desired exposure of the image; and a display for displaying the exposure data to a user for allowing the user to select when to actuate the shutter release for capturing the image with the desired color temperature and exposure for achieving the known color temperature and exposure of the image.

8. The system of claim 7, wherein the processor controls at least one of shutter speed, aperture, and ISO of the digital imaging device for achieving the desired color temperature and exposure of the image.

9. The system of claim 8, wherein upon actuation of the shutter release by the user, the processor actuates the shutter at the determined shutter speed for achieving the desired color temperature and exposure of the image.

10. The system of claim 9, wherein upon actuation of the shutter release by the user, the processor actuates the shutter more than once and at least one determined shutter speed for capturing more than one image, each of the more than one image captured with a desired color temperature and desired exposure, such that the color temperature of each of the more than one image comprises a portion of a color spectrum.

11. The system of claim 10, wherein each of the more than one image captured are combined for creating an image file comprising full spectrum color temperature information.

12. The system of claim 10, wherein each of the more than one image captured are combined for creating an image file comprising monochromatic color temperature information.

13. The system of claim 7, wherein the processor stores the light source data with metadata of each image captured.

14. A method comprising:
providing a light source comprising at least one lamp capable of emitting light at different intensities and color temperatures;
varying at least one of intensity and color temperature of light emitted by the light source at predetermined time intervals;
generating light source data comprising at least one of intensity and color temperature of light emitted by the light source and timing of at least one of intensity and color temperature of light emitted by the light source; and
providing a digital imaging device, the digital imaging device,
receiving a signal comprising the light source data;
processing the light source data for generating exposure data, the exposure data including when to commence capturing at least one image of a desired color temperature and exposure and at least one of shutter speed and aperture of the digital imaging device; and
displaying the exposure data to a user for allowing the user to select when to actuate a shutter release of the digital imaging device for capturing the at least one image with the desired color temperature and exposure and for selecting at least one of shutter speed and aperture of the digital imaging device for achieving the desired color temperature and exposure of the at least one image.

15. The method of claim 14, further comprising:
the processor controlling at least one of shutter speed, aperture, and ISO of the digital imaging device for achieving the desired color temperature and exposure of the image.

16. The method of claim 14, further comprising:
upon actuation of the shutter release by the user, the processor repeatedly actuating the shutter more than once determined point and at least one determined shutter speed for capturing more than one image, each of the more than one image captured with a desired color temperature and exposure, such that the color temperature of each of the more than one image comprises a portion of a color spectrum.

17. The method of claim 16, further comprising:
combining each of the more than one image for creating an image file, the image file comprising full spectrum color temperature information.

18. A method comprising:
providing a light source comprising at least one lamp capable of emitting light at different intensities and color temperatures;
varying at least one of intensity and color temperature of light emitted by the light source at predetermined time intervals;
generating light source data comprising at least one of intensity and color temperature of light emitted by the light source and timing of at least one of intensity and color temperature of light emitted by the light source;
providing a digital imaging device, digital imaging device,
receiving a signal comprising the light source data;
continuously processing the light source data for continuously generating exposure data, the exposure data comprising different determined points in time to commence capturing at least one image of a desired color temperature and exposure and at least one of shutter speed and aperture of the digital imaging device;
displaying the exposure data to a user for allowing the user to select different determined points in time to actuate a shutter release of the digital imaging device for capturing the at least one image with the desired color temperature and exposure and for selecting at least one of shutter speed and aperture of the digital imaging device for achieving the desired color temperature and exposure of the at least one image;
selecting at least one of a plurality of different shutter speeds and a plurality of different apertures of the digital imaging device;
actuating the shutter repeatedly at different determined points in time, each actuation of the shutter with at least one of a selected one of the plurality of different shutter speeds and plurality of different apertures for generating a plurality of images with different desired color temperatures and exposures; and
combining data from the plurality of images with different desired exposures and color temperatures for creating an image file comprising full spectrum color temperature information.

19. The method of claim 18, further comprising:
the processor controlling more than one of shutter speed, aperture, and ISO of the digital imaging device for achieving the desired color temperatures and exposures of the plurality of images.

20. The method of claim 18, further comprising:
upon actuation of the shutter release by the user, the processor repeatedly actuating the shutter at more than one determined point in time and at least one determined shutter speed for capturing more than one image, each of the more than one image captured with a desired color temperature and exposure, such that the color temperature of each of the more than one image comprises a portion of a color spectrum.

* * * * *